(12) United States Patent
Miller

(10) Patent No.: US 10,569,877 B2
(45) Date of Patent: Feb. 25, 2020

(54) DRONE DISPENSING DEVICE

(71) Applicant: United Tactical Systems, LLC, Lake Forest, IL (US)

(72) Inventor: Donald David Miller, Oak Brook, IL (US)

(73) Assignee: United Tactical Systems, LLC, Lake Forest, IL (US)

( * ) Notice: Subject to any disclaimer, the term of this patent is extended or adjusted under 35 U.S.C. 154(b) by 97 days.

(21) Appl. No.: 15/872,241

(22) Filed: Jan. 16, 2018

(65) Prior Publication Data

US 2018/0201372 A1    Jul. 19, 2018

Related U.S. Application Data

(60) Provisional application No. 62/446,552, filed on Jan. 16, 2017.

(51) Int. Cl.
| | |
|---|---|
| *B64D 1/16* | (2006.01) |
| *B64C 39/02* | (2006.01) |
| *B05B 7/00* | (2006.01) |
| *B05B 7/14* | (2006.01) |
| *B05B 13/00* | (2006.01) |
| *B05B 7/12* | (2006.01) |
| *B05B 1/30* | (2006.01) |

(52) U.S. Cl.
CPC .............. *B64D 1/16* (2013.01); *B05B 7/0081* (2013.01); *B05B 7/12* (2013.01); *B05B 7/144* (2013.01); *B05B 7/1413* (2013.01); *B05B 7/1422* (2013.01); *B05B 7/1436* (2013.01); *B05B 13/005* (2013.01); *B64C 39/024* (2013.01); *B05B 1/3026* (2013.01); *B64C 2201/024* (2013.01); *B64C 2201/12* (2013.01)

(58) Field of Classification Search
CPC .......... B64D 1/16; B64D 1/18; B64C 39/024; B64C 2201/024; B64C 2201/12; B64C 2201/128; B05B 7/0081; B05B 7/1436; B05B 7/144; A62C 3/0228; A62C 3/0235
See application file for complete search history.

(56) References Cited

U.S. PATENT DOCUMENTS

| | | | | |
|---|---|---|---|---|
| 3,688,952 A | * | 9/1972 | Barlow | ..................... B64D 1/16 222/333 |
| 4,376,466 A | * | 3/1983 | Hara | ........................ A62C 3/00 169/53 |
| 10,139,007 B1 | * | 11/2018 | Wulf | ........................ F16K 31/02 |
| 10,155,587 B1 | * | 12/2018 | Tang | ..................... B64C 39/024 |

(Continued)

*Primary Examiner* — Darren W Gorman
(74) *Attorney, Agent, or Firm* — Barnes & Thornburg LLP

(57) ABSTRACT

A dispensing device for connection to a drone is provided. The dispensing device has an outer housing and an inner housing interior of the outer housing. The inner housing has an inner cavity having an entrance opening and an opposing exhaust opening. The area between the outer housing and the inner housing defines an outer cavity adapted to hold a material. The dispensing device also has a fluid access opening to provide fluid access between outer cavity and the inner cavity to allow material in the outer cavity to be transferred to the inner cavity and mixed with air to create an air and material mixture. An air accelerator is provided adjacent the inner cavity to accelerate the air and material mixture out of the dispensing device.

20 Claims, 14 Drawing Sheets

(56) References Cited

U.S. PATENT DOCUMENTS

2010/0263886 A1* 10/2010 Rahgozar ............. A62C 3/0235
                                                             169/46
2016/0260207 A1*  9/2016 Fryshman ............. G06T 7/0008
2019/0037828 A1*  2/2019 Bennett ................. B64C 39/024

* cited by examiner

DRONE DISPENSING DEVICE

CROSS-REFERENCE TO RELATED APPLICATIONS

This application claims the benefit of U.S. Provisional Patent Application No. 62/446,552, filed Jan. 16, 2017, which is expressly incorporated herein by reference and made a part hereof.

FEDERALLY SPONSORED RESEARCH OR DEVELOPMENT

Not Applicable.

TECHNICAL FIELD

The present disclosure relates generally to dispensing devices, and more specifically to an overhead drone dispensing device for dispensing a controlled volume of a material from the dispensing device.

BACKGROUND

Dispensing devices are well known in the art. While such dispensing devices according to the prior art provide a number of advantages, they nevertheless have certain limitations. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY

According to one embodiment, the disclosed subject technology relates to a dispensing device for dispensing a material in an air/material mixture toward the ground from a dispenser located a distance above the ground.

The disclosed subject technology further relates to a dispensing device for connection to a drone, comprising: an outer housing; an inner housing interior of the outer housing, the inner housing having an inner cavity, the inner cavity having an entrance opening at a first end of the inner cavity and an exhaust opening at a second end of the inner cavity; an outer cavity between the outer housing and the inner housing, the outer cavity adapted to hold a material; an upper cap closing a first end of the outer cavity; a lower cap closing a second end of the outer cavity; an aperture in the inner housing proximal a bottom of the outer housing to provide fluid access between outer cavity and the inner cavity to allow material in the outer cavity to be transferred to the inner cavity and mixed with air to create an air and material mixture; a closure member adjacent the aperture to open and close the aperture as desired to dispense material from the outer cavity into the inner cavity for mixing with air in the inner cavity; a controller for controlling movement of the closure member between a first position where the aperture is closed, and a second position where the aperture is open; and, a fan adjacent the exhaust opening to the inner cavity to accelerate the air and material mixture out of the dispensing device.

The disclosed subject technology further relates to a dispensing device for connection to a drone, comprising: an outer housing; an inner housing interior of the outer housing, the inner housing having an inner cavity having an entrance opening at a first end of the inner cavity and an exhaust opening at a second end of the inner cavity; an outer cavity between the outer housing and the inner housing, the outer cavity adapted to hold a material; an upper cap closing a first end of the outer cavity; a lower cap closing a second end of the outer cavity; a fluid access opening to provide fluid access between outer cavity and the inner cavity to allow material in the outer cavity to be transferred to the inner cavity and mixed with air to create an air and material mixture; and, an air accelerator adjacent the inner cavity to accelerate the air and material mixture out of the dispensing device.

The disclosed subject technology further relates to a dispensing device for connection to a drone, comprising: an outer housing connected to a drone; an inner housing interior of the outer housing, the inner housing having an inner cavity having an entrance opening at a first end of the inner cavity and an exhaust opening at a second end of the inner cavity; an outer cavity between the outer housing and the inner housing, the outer cavity adapted to hold a material; an upper cap closing a first end of the outer cavity; a lower cap closing a second end of the outer cavity; an fluid access opening to provide fluid access between outer cavity and the inner cavity to allow material in the outer cavity to be transferred to the inner cavity; and, an air accelerator adjacent the inner cavity to accelerate the air and material mixture out of the dispensing device.

The disclosed subject technology further relates to a dispensing device wherein the closure member comprises a seal inside the inner cavity, the seal rotating between the first position and the second position.

The disclosed subject technology further relates to a dispensing device having a driver electrically connected to the controller, the driver moving the closure member between the first position and the second position. In one embodiment, the driver comprises a gear connected to the closure member to rotate the closure member between the first position and the second position. In an alternate embodiment, the driver comprises a motor, such as a servo motor, having a gear to drive rotation of the closure member.

The disclosed subject technology further relates to a dispensing device wherein the controller comprises a receiver for receiving a radio frequency signal from a remote device.

The disclosed subject technology further relates to a dispensing device having a cover over the entrance opening of the inner housing, the cover having a plurality of apertures there through.

The disclosed subject technology further relates to a dispensing device having a funnel below a surface of the cover to direct air into the entrance opening of the inner housing.

The disclosed subject technology further relates to a dispensing device having a connector to secure the dispensing device to the drone.

The disclosed subject technology further relates to a dispensing device wherein the air accelerator is a fan adjacent the exhaust opening to the inner cavity. In an alternate embodiment, the air accelerator is a fan adjacent the entrance opening to the inner cavity.

The disclosed subject technology further relates to a dispensing device having a closure member adjacent the fluid access opening to open and close the fluid access opening as desired to dispense material from the outer cavity into the inner cavity for mixing with air in the inner cavity;

The disclosed subject technology further relates to a dispensing device wherein the outer housing is connected to the drone adjacent a side of the drone. In another embodiment the outer housing is connected to the drone adjacent a bottom of the drone.

The disclosed subject technology further relates to a dispensing device wherein the air accelerator accelerates the air and material mixture a distance beyond a turbulence area of the drone.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

DETAILED DESCRIPTION

Figure 1:
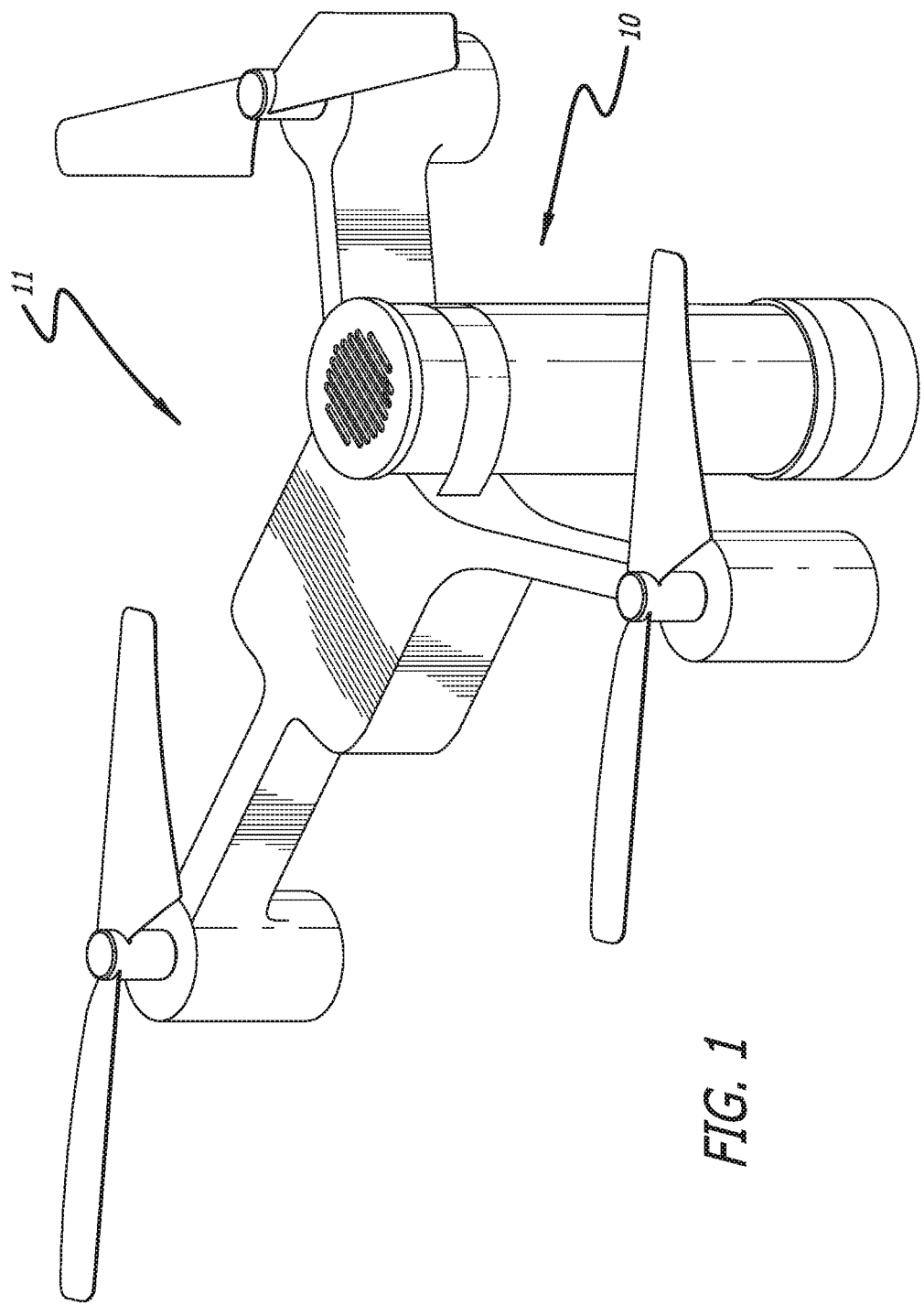
FIG. 1 is a perspective view of a dispensing device being carried by a drone according to one embodiment.

While the dispensing device discussed herein is susceptible of embodiments in many different forms, there is shown in the drawings, and will herein be described in detail, preferred embodiments with the understanding that the present description is to be considered as an exemplification of the principles of the dispensing device and is not intended to limit the broad aspects of the disclosure to the embodiments illustrated.

Figure 2:
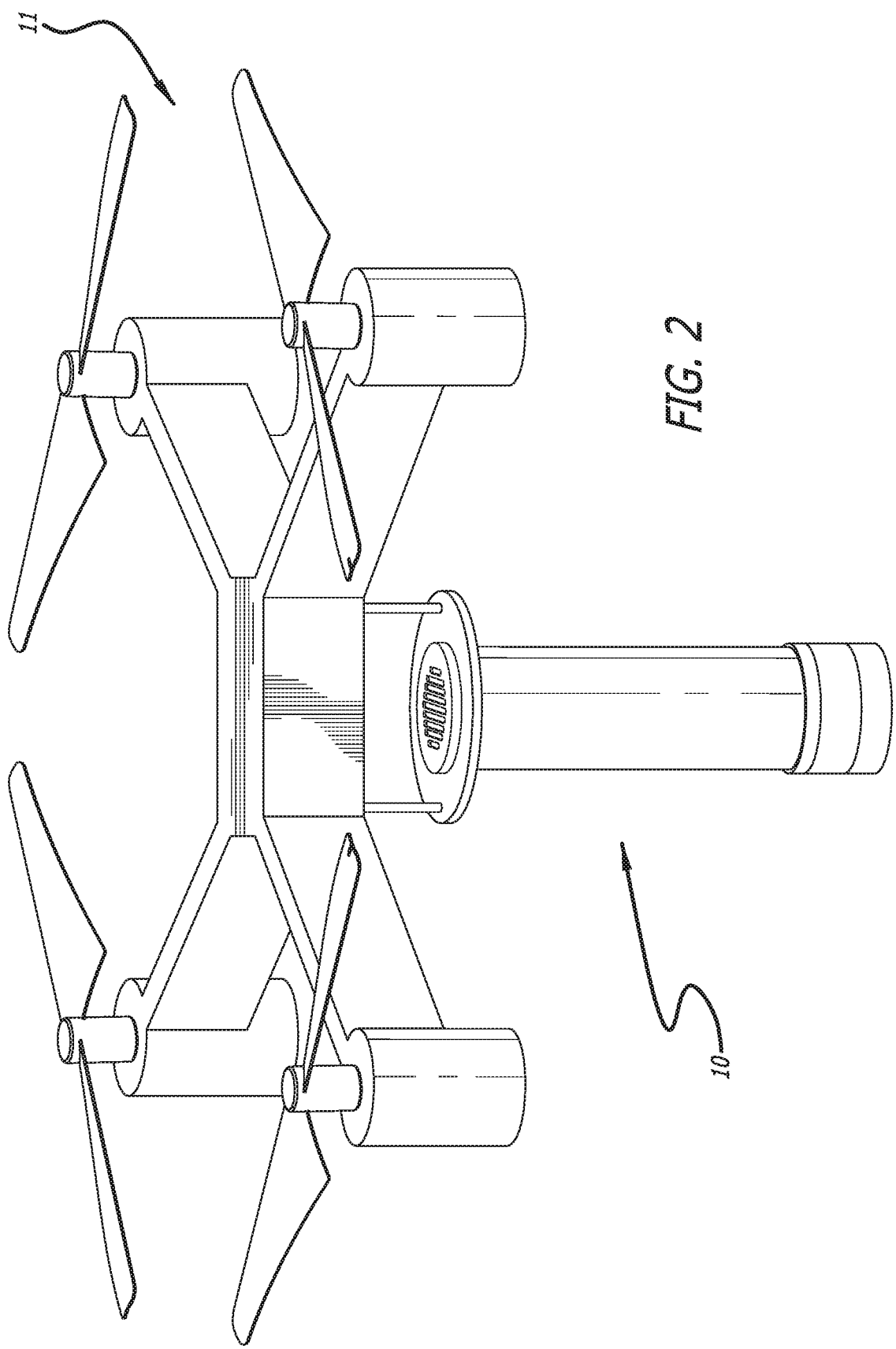
FIG. 2 is a perspective view of a dispensing device being carried by a drone according to another embodiment.

Referring now to the figures, and initially to FIGS. 1 and 2, there is shown a dispensing device 10, preferably for connection to a drone 11 or other flying apparatus. In one embodiment the dispensing device 10 is provided for dispensing a powder or other material contained in the dispensing device 10. Preferably, the dispensing device is utilized to dispense material toward the ground from an above-ground elevation, such as for dispensing a pepper spray powder from the dispensing device 10 connected to the drone 11 or other flying apparatus toward a crowd below the flying apparatus. In the embodiment of FIG. 1, the dispensing device 10 is connected to the drone 11 adjacent a side of the drone 11. In the embodiment of FIG. 2, the dispensing device 10 is connected to the drone 11 adjacent a bottom of the drone 11.

Figure 3:
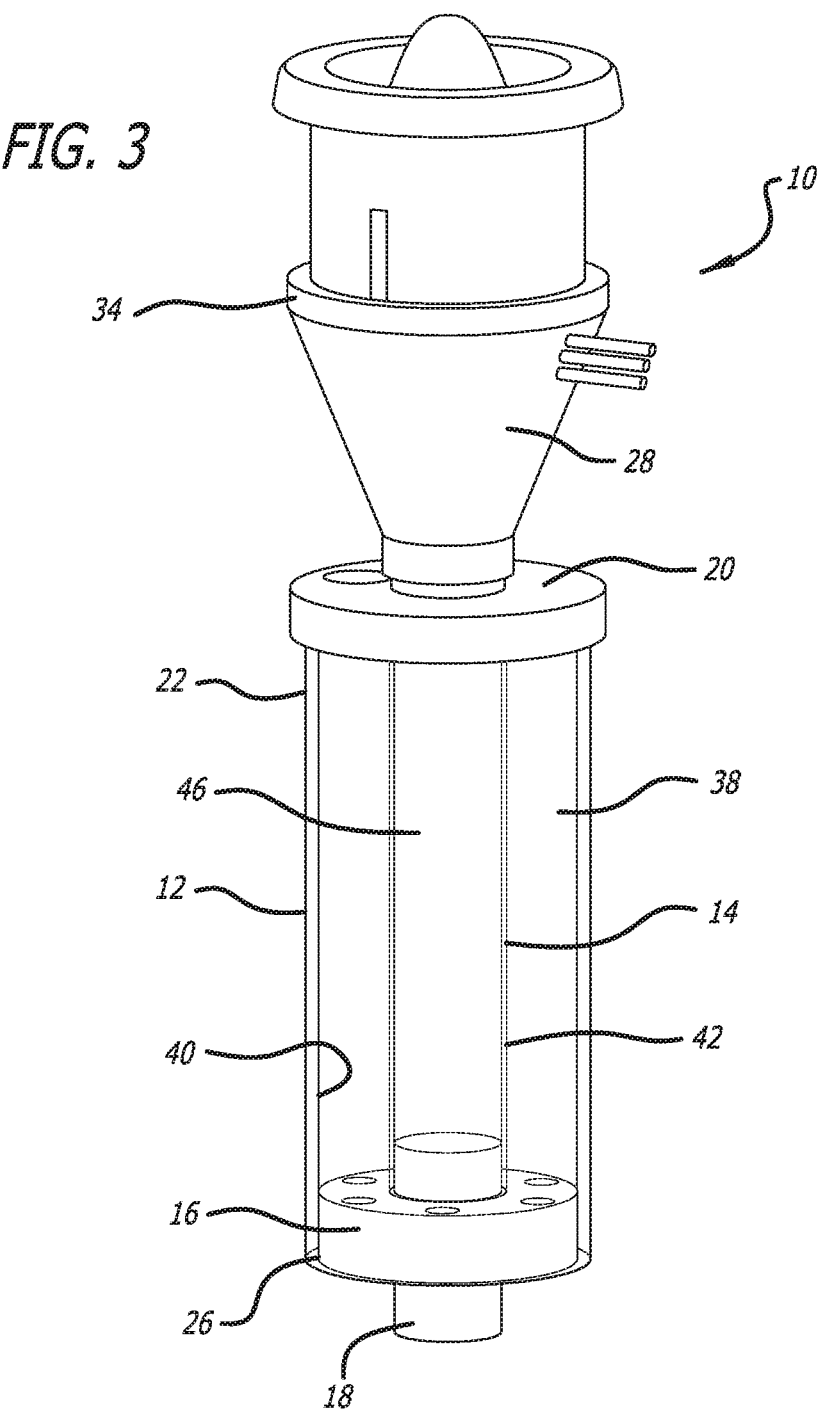
FIG. 3 is a front perspective view of a dispensing device according to one embodiment.
Figure 4:
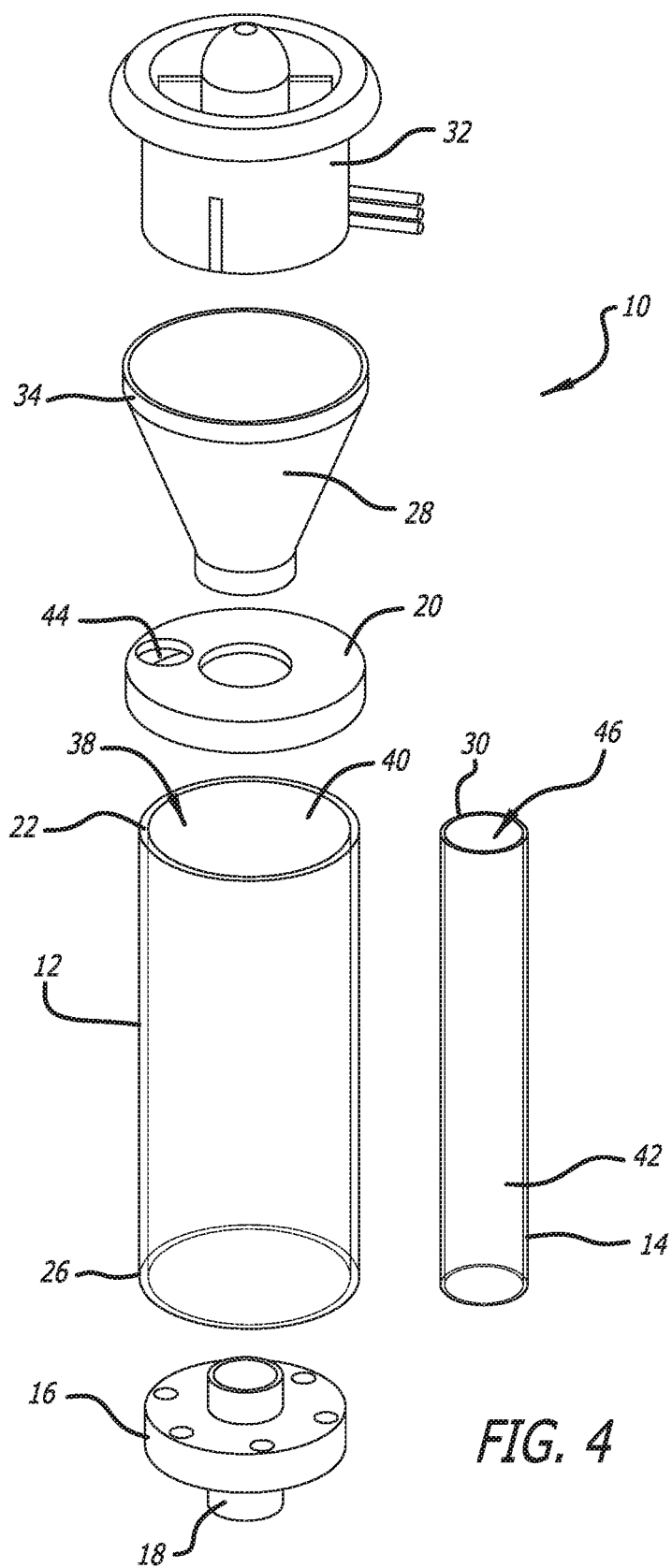
FIG. 4 is an exploded perspective view of the dispensing device of FIG. 3.
Figure 5:
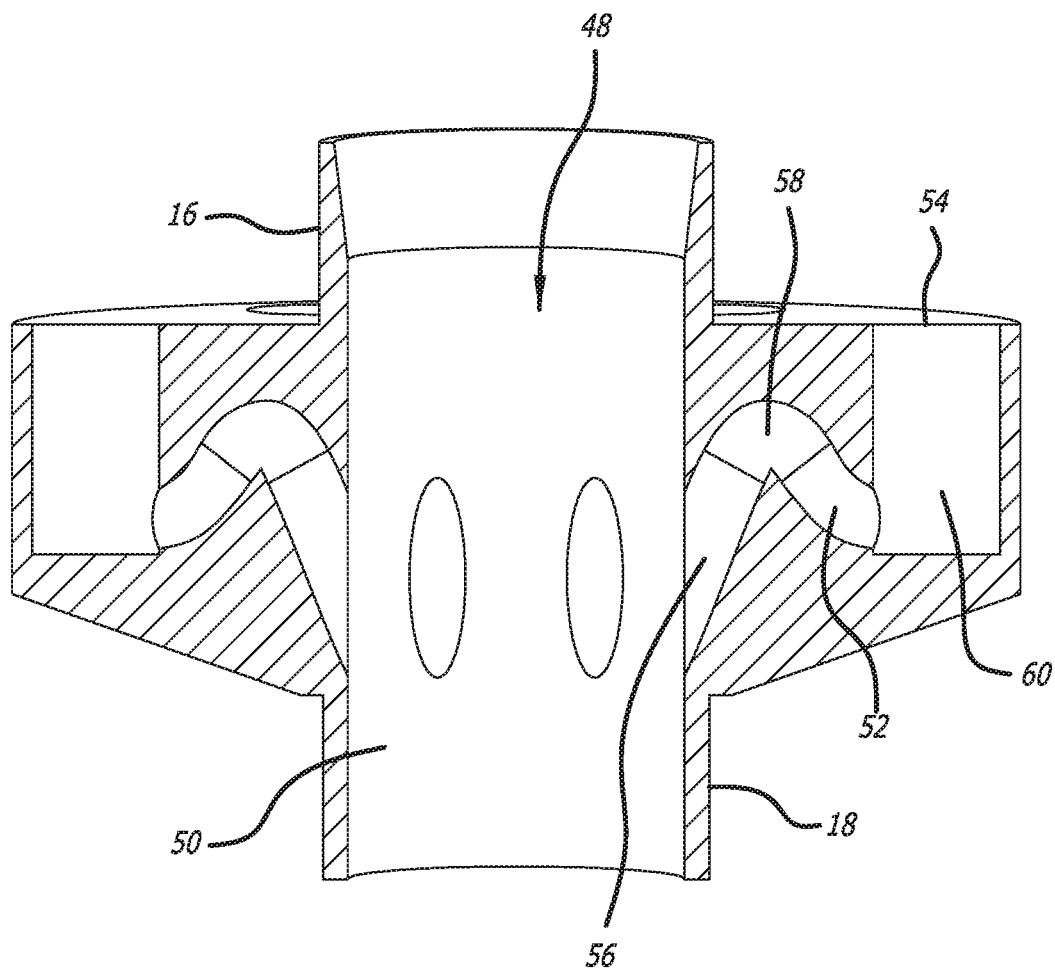
FIG. 5 is a cross-sectional view of the venturi flow meter in the dispensing device of FIG. 3.
Figure 6:
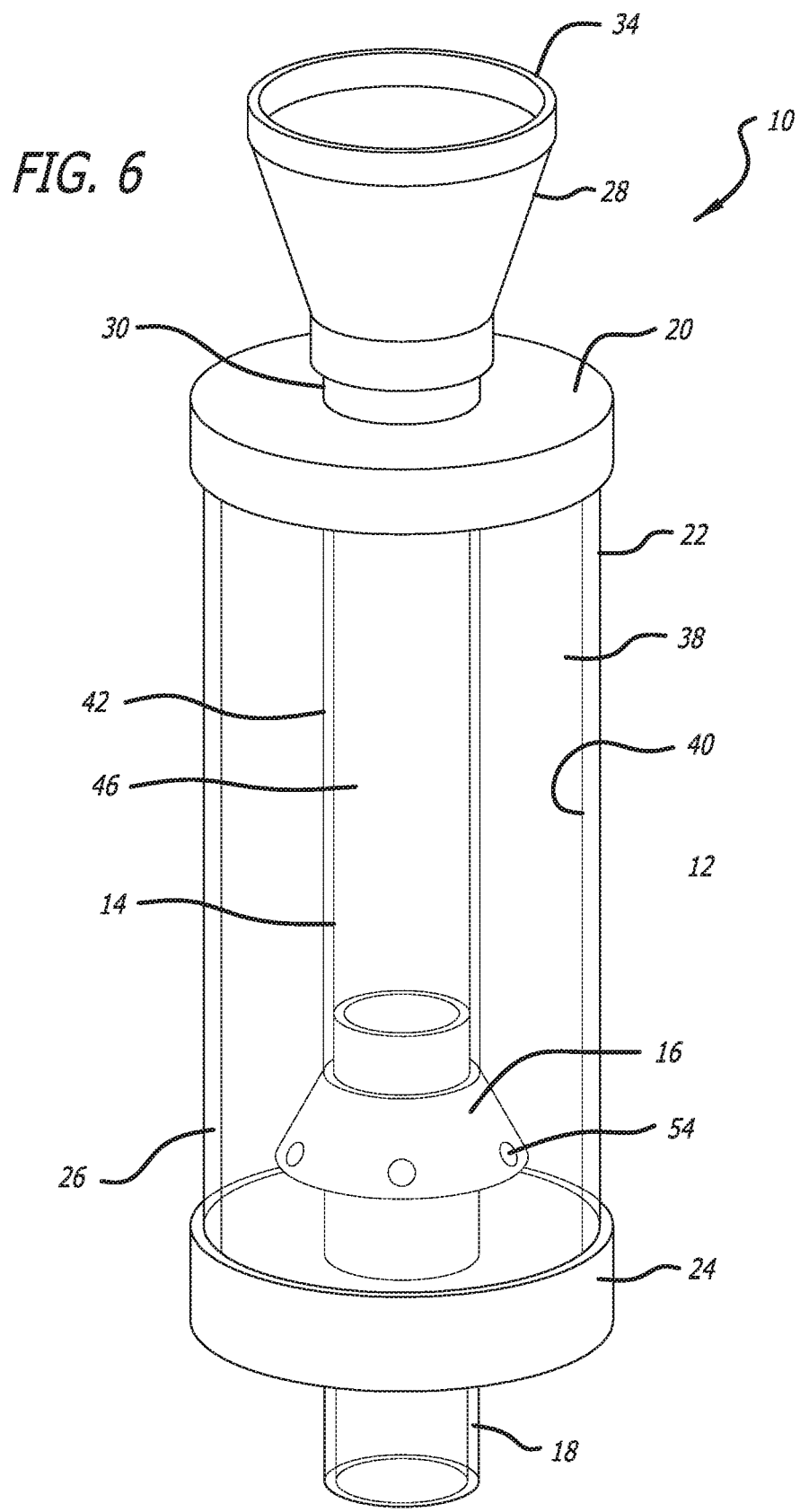
FIG. 6 is a front perspective view of a dispensing device according to another embodiment.

In one embodiment, as shown in FIGS. 3 and 4, the dispensing device 10 comprises an outer housing 12, an inner housing 14 within the outer housing 12, a mixing device 16 adjacent the end of the inner housing 14, and an outlet or an exhaust 18 provided at an end of the mixing device 16. In alternate embodiments, the dispensing device 10 may also include a top cap 20 closing a first end 22 of the outer housing 12, a bottom cap 24 closing a second end 26 of the outer housing 12, a funnel 28 at a first end 30 of the inner housing 14, and an air accelerating device 32 at an opening 34 to the funnel 28. In one embodiment, such as shown in FIGS. 3-5, the mixing device 16 is also the bottom cap 24. In an alternate embodiment, such as shown in FIG. 6, a separate bottom cap 24 is provided and the mixing device 16 is in-line with the inner housing 14 and spaced between the bottom cap 24 and the top cap 20, preferably closer to the bottom cap 24. Similarly, in one embodiment, such as shown in FIGS. 3-5, the mixing device 16 is integral with and includes the exhaust opening 18, whereas in the embodiment of FIG. 6, the mixing device 16 is separate from the exhaust opening 18.

As shown in FIGS. 3 and 6, the inner housing 14 is nested within the outer housing 12, and an outer cavity 38 is created between an interior wall 40 of the outer housing 12 and the exterior wall 42 of the inner housing 14. A top of the outer cavity 38 is defined by the top cap 20 at one end, and a bottom of the outer cavity 38 is defined by the bottom cap 24 at the other end. However, in the embodiment of FIG. 3, where the mixing device 16 operates as the bottom cap 24, the mixing device 16 will therefore operate as the bottom of the outer cavity 38 in that embodiment. The outer cavity 38 retains a material that is to be dispensed from the dispensing device 10. The material is preferably a powder, however alternate materials may be utilized. When the dispensing device 10 is assembled, material may be inserted into the outer cavity 38 through an opening 44 in the top cap 20. A stopper or other cap (not shown) may be utilized to close the opening 44. Alternately, after filling the outer cavity 38 the opening 44 may be permanently sealed. Alternately, the outer cavity 38 may be filled and then the top cap 20 assembled thereto.

To dispense material from the dispensing device 10, air or some other gas is accelerated through an inner cavity 46 of the inner housing 14 and further through the inner cavity 48 of the mixing device 16. In a preferred embodiment, the inner cavity 48 of the mixing device 16, as best shown in FIGS. 7 and 8, has a venturi shape and operates as a venturi 50, which by definition contains a constriction or smaller cross section. In fluid dynamics, a fluid's velocity (here, the gas passing through the inner cavity 48 of the mixing device 16) must increase as it passes through a constriction in accord with the principle of mass continuity, while its static pressure must decrease in accord with the principle of conservation of mechanical energy. Thus any gain in kinetic energy a fluid may accrue due to its increased velocity through a constriction is balanced by a drop in pressure. By measuring the change in pressure, the flow rate of the fluid at the exit of the venturi 50 can be determined. Further, as explained below, the venturi portion 50 of the mixing device 16 can also be used to mix the gas passing through the venturi 50 with the material contained in the outer cavity 38 of the dispensing device 10.

Figure 7:
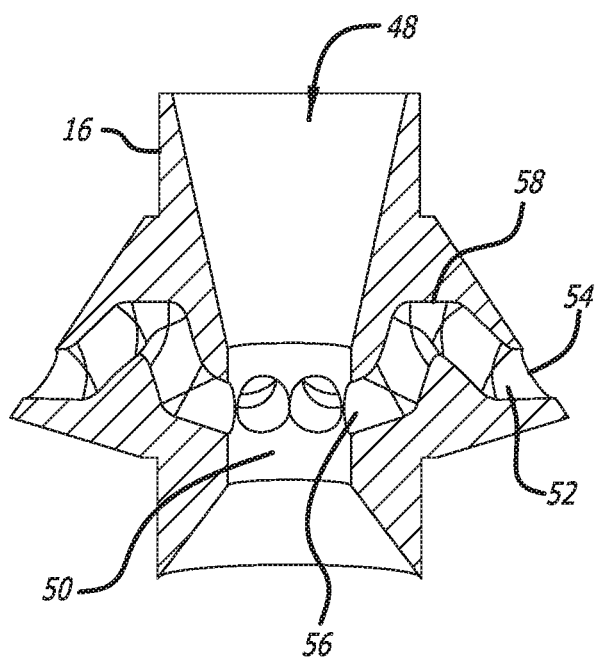
FIG. 7 is a cross-sectional view of the venturi flow meter in the embodiment of FIG. 6.
Figure 8:
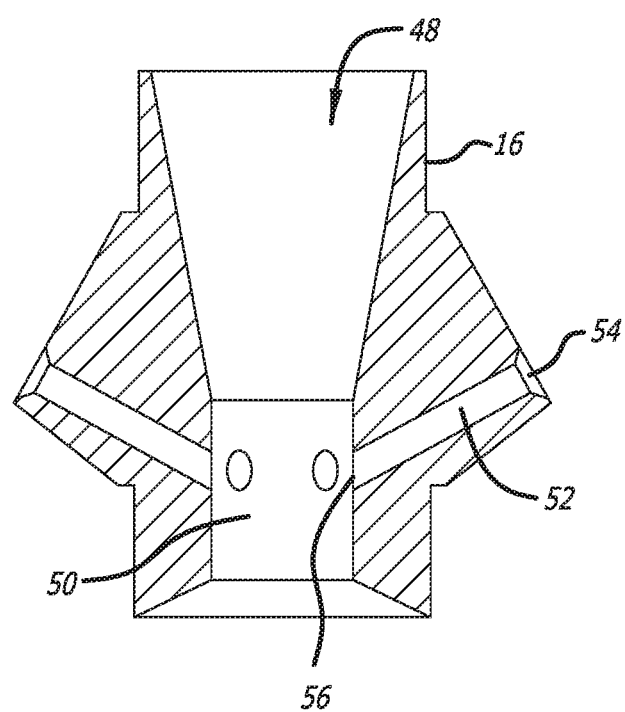
FIG. 8 is a cross-sectional view of another venturi flow meter that may be used in a dispensing device, including in the embodiment of FIG. 6.
Figure 9:
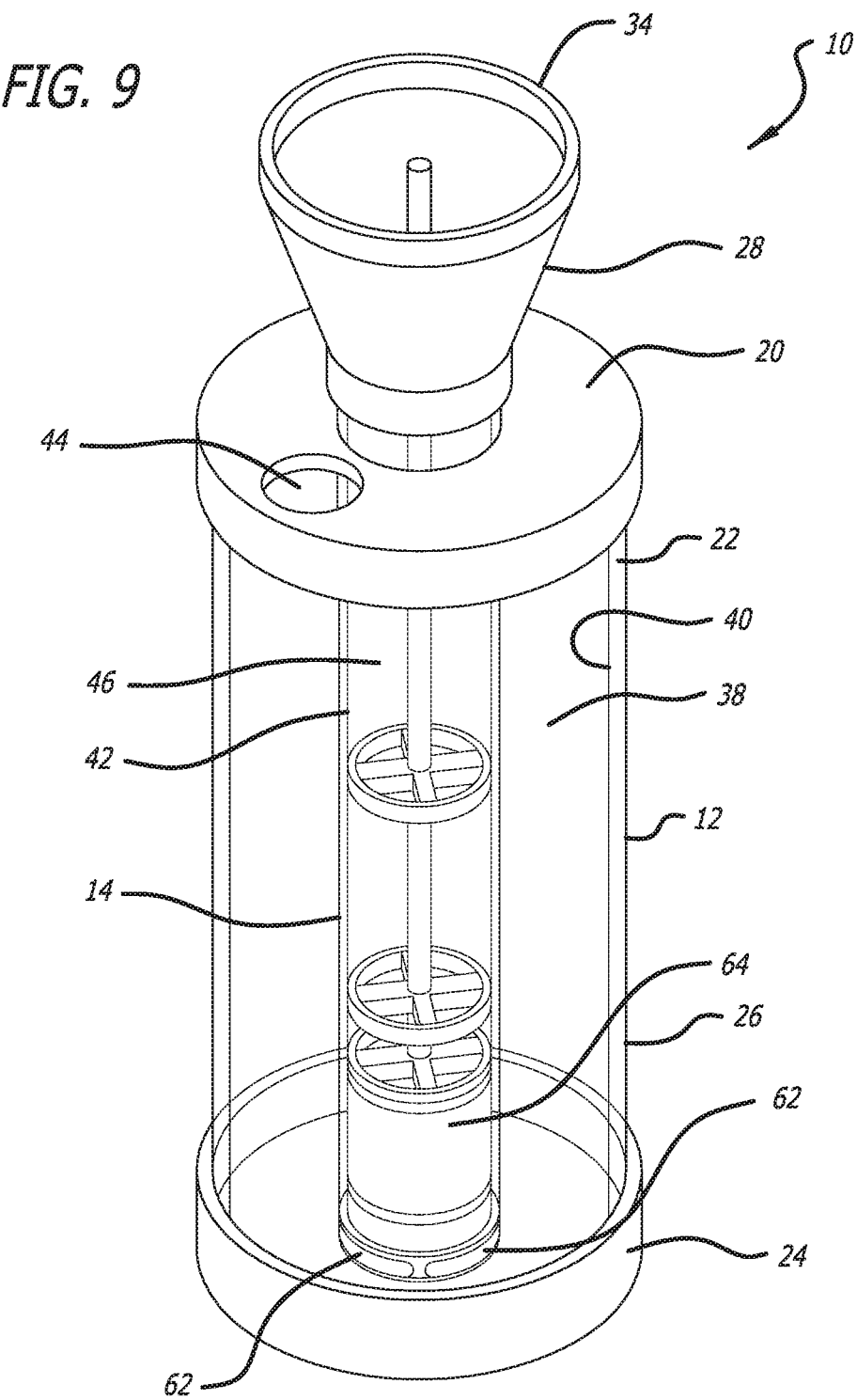
FIG. 9 is a front perspective view of a dispensing device according to another embodiment.
Figure 10:
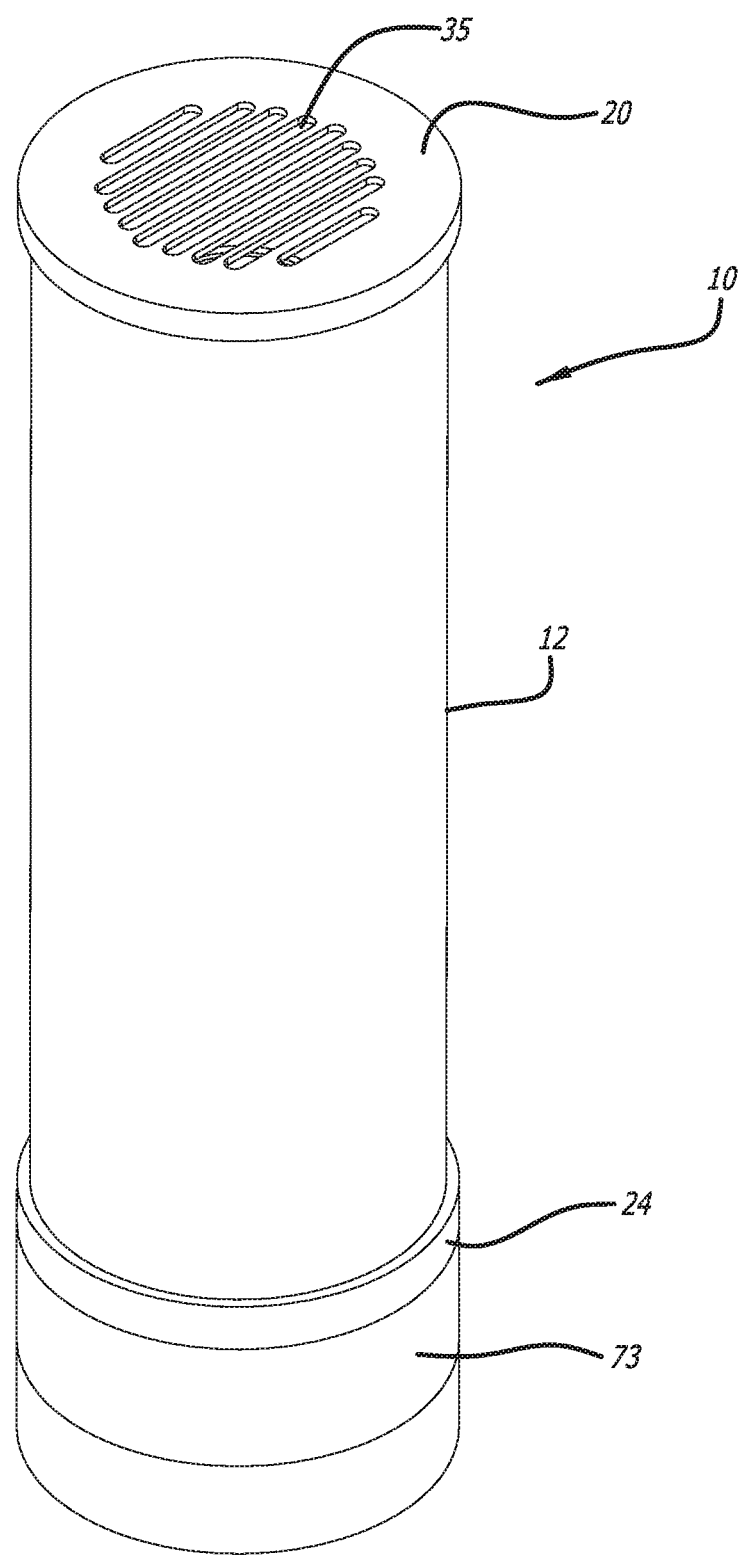
FIG. 10 is a front top perspective view of a drone dispensing device according to another embodiment.
Figure 11:
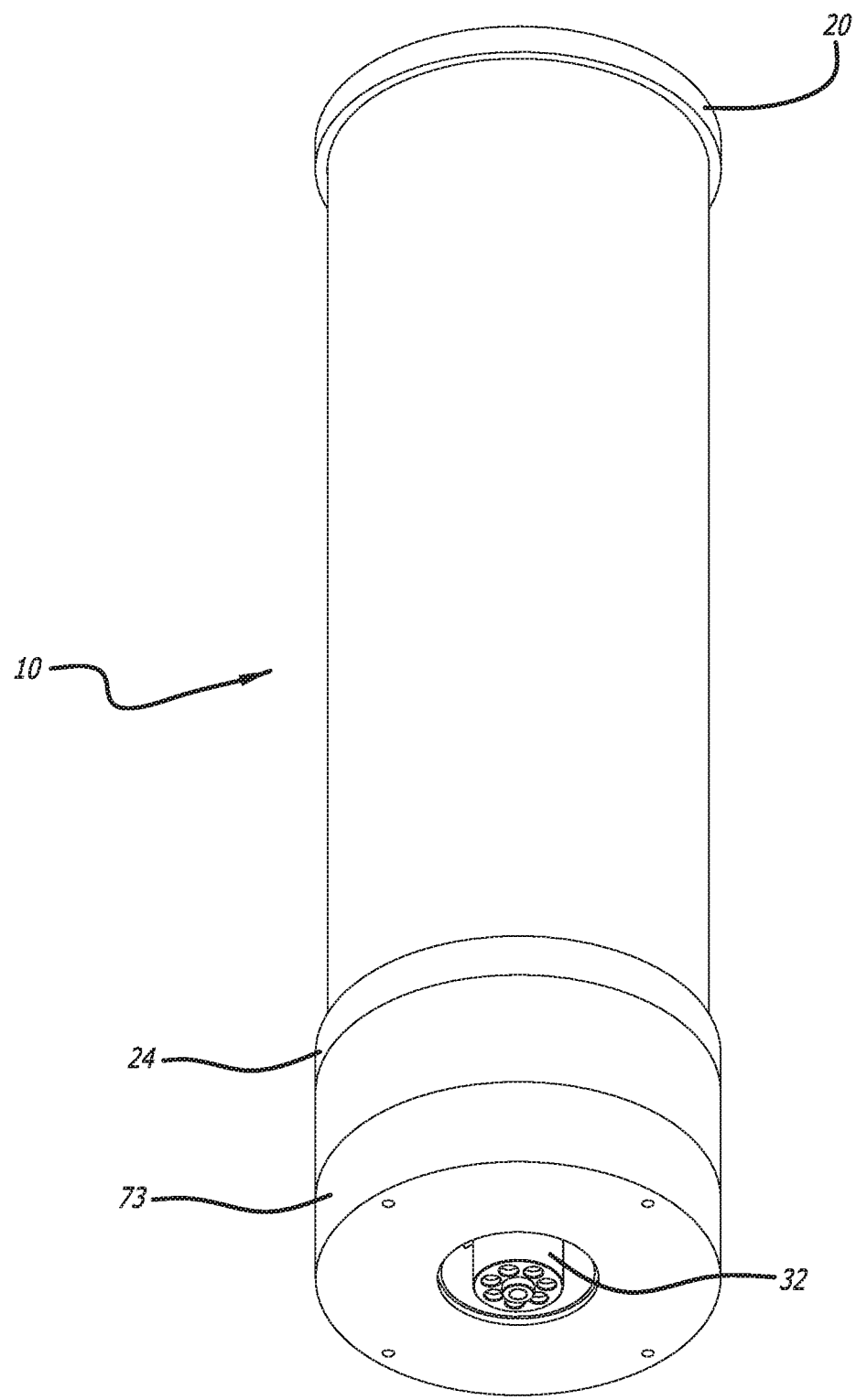
FIG. 11 is a front bottom perspective view of the drone dispensing device of FIG. 10.

With reference to FIGS. 5, 7 and 8, the mixing device 16 has a series of inlets 52 that connect the exterior of the mixing device 16 with the interior cavity 48 of the mixing device 16. Accordingly, as shown in FIGS. 3 and 6, the inlets 52 fluidly connect the outer cavity 38 of the dispensing device 10 with the interior cavity 46, 48 of the inner housing 14 and mixing device 16. In different embodiments the inlets 52 have a different shape. For example, in the embodiment of FIG. 8, the inlets 52 comprise a straight tubular form that extends angularly downward from the opening 54 of the inlet 52 at the exterior of the mixing device 16 to the exit 56 of the inlet 52 in the interior cavity 48 of the mixing device. In the embodiment of FIG. 7, the inlets 52 also comprise a tubular shape, but their tubular shape has a raised portion 58 between the opening 54 of the inlet 52 and the exit 56 of the inlet 52. In one embodiment, the raised portion 58 operates to assist in preventing material within the cavity 38 of the dispensing device 10 from being dispensed prematurely. In the embodiment of the mixing device 16 shown in FIG. 5, the inlet 52 similarly has a raised portion 58, but the opening 54 leads to a vertical tube 60 that has been found to assist in the flow of material from the interior cavity 38 of the dispensing device 10.

Referring to FIG. 3, in a preferred embodiment the dispensing device 10 utilizes an air accelerating device 32, such as a high velocity air supply 32, which could be a fan, a turbo device, a source of compressed gas, etc. The air accelerating device 32 provides a flow of air through the interior cavity 46 of the inner tube 14 and further through the inner cavity 48 of the mixing device 16 (i.e., through the venturi portion 50 of the mixing device 16). As the gas passes through the inner cavity 48 of the mixing device 16, material from the cavity 38 in the dispensing device 10 is sucked via a vacuum created in the venturi 50 through the inlets 52 because of the change in pressure in the venturi 50, as well as via the air flow from the air supply device 32, and a mixture of gas and material (e.g., powder) will be created at the exit of the venturi 50 to be dispelled at an increased velocity from the exhaust opening 18 of the dispensing device 10. In one embodiment, the air accelerating device 32 is connected to a funnel 28 to direct the air into the interior cavity 46 of the inner tube 14.

Accordingly, the dispensing device 10 operates to exhaust a mixture of gas (i.e., air) and material (i.e., such as a powder present in the outer cavity 38) at a known and controllable flow rate, which is preferably an increased speed. The rate of mixing of the material with the gas is controlled by the flow of the gas through the venturi 50. The faster the flow of gas through the venturi 50 the greater the mix ratio.

An alternate embodiment is shown in FIG. 9. In that embodiment no venturi 50 is utilized. Instead gas that flows through the interior cavity 46 of the inner housing 14 via the air acceleration device 32. The inner housing 14 has apertures 62 in it to allow the material in the outer cavity 38 of the dispensing device 10 to flow into the interior cavity 46 of the inner housing 14 and become mixed with the gas flowing through the inner housing 14. A moveable and controllable stopper 64 is provided in the inner housing 14 to controllably open and close the apertures 62 when dispensing of the material is desired and not desired. Wires or other means may be used to controllably move the inner stopper 64.

In a preferred embodiment, the material mixed with the accelerated gas that is dispelled out of the exhaust member 18 is dispelled approximately 15 feet from the dispensing device 10. When the dispensing device 10 is connected to a flying apparatus, such as a drone, it is preferred to exhaust the gas/material mixture a distance away from the dispensing device such that the gas/material mixture extends away from the turbulence of the flying apparatus caused by the rotary blades of the flying device. However, once the gas/material mixture is forced out of the zone of turbulence, the rotor wash of the rotary blades helps to further accelerate the gas/material mixture toward the ground.

In an alternate embodiment, the mixture in the cavity 38 of the dispensing device is merely dropped from the dispensing device due to gravity.

An alternate embodiment of the dispensing device 10 is shown in FIGS. 10 through 15. In this embodiment, the dispensing device 10 utilizes an air acceleration device 32 that is provided adjacent the exhaust opening 18 to the inner cavity 46 to accelerate the air and material mixture out of the dispensing device 10. In one embodiment the air acceleration device 32 is an electro-ducted fan or EDF. Referring to FIG. 12, the dispensing device 10 may comprise an outer housing 12 and an inner housing 14 interior of the outer housing 12. The inner housing 14 has an inner cavity 46, which may also operate as the inner cavity 48 of the mixing device 16. The inner cavity 46 has an entrance opening 31 at a first end 30 of the inner cavity 46 and an exhaust opening 18 at a second end 33 of the inner cavity 46. An outer cavity 38 is defined between the outer housing 12 and the inner housing 14. The material for dispensing is preferably retained within the outer cavity 38. Additionally, a spacer 37 may be provided to maintain proper spacing between the inner housing 14 and the outer housing 12.

As shown in FIGS. 12 and 14-15, the outer cavity 38 has an upper cap 20 at a top end 21 of the outer cavity 38, and a lower cap 24 at the lower end 23 of the outer cavity 38. In one embodiment the upper cap 20 also comprises a cover over the entrance opening 31 to the inner cavity 46, however, the portion of the cover over the entrance opening 31 has a plurality of apertures 35 there through. Alternately, the cover over the entrance opening 31 may be a separate component from the upper cap 20 for the outer cavity 38. Further, a funnel 28 may be provided at the entrance opening 31 to direct air into the entrance opening 31 of the inner housing 46. In one embodiment the funnel 28 is part of the upper cap 20, but in alternate embodiments it is a separate component.

In one embodiment the inner housing 14 has at least one aperture 62 there through to provide fluid access between the outer cavity 38 and the inner cavity 46 to allow material in the outer cavity 38 to be transferred to the inner cavity 46 and mixed with air to create an air and material mixture. In one embodiment two apertures 62 are provided in opposing sides of the inner housing 14. The apertures 62 may have an angled shape about the circumference of the inner housing 14, however, this shape may be varied. Preferably, the apertures 62 are provided toward a bottom of the inner housing 14 as well as toward a bottom of the outer housing 12. The apertures 62 provide fluid access between the outer cavity 38 and the inner cavity 46. The apertures 62 operate as a mixing device as previously described. Alternately, a separate mixing device may be utilized instead of the apertures.

A closure member 64 is provided adjacent the apertures 62 to selectively open and close the apertures 62 in the inner housing 14. In one embodiment the closure member 64 is provided in the inner cavity 46 of the inner housing 14. In a preferred embodiment the inner housing 14 is tubular in shape, and a portion of the closure member 64 is similarly tubular or cylindrical in shape to match the shape of the inner wall of the inner housing 14. The closure member 64 preferably provides a valve or seal to seal the apertures when in the closed position.

Figure 12:
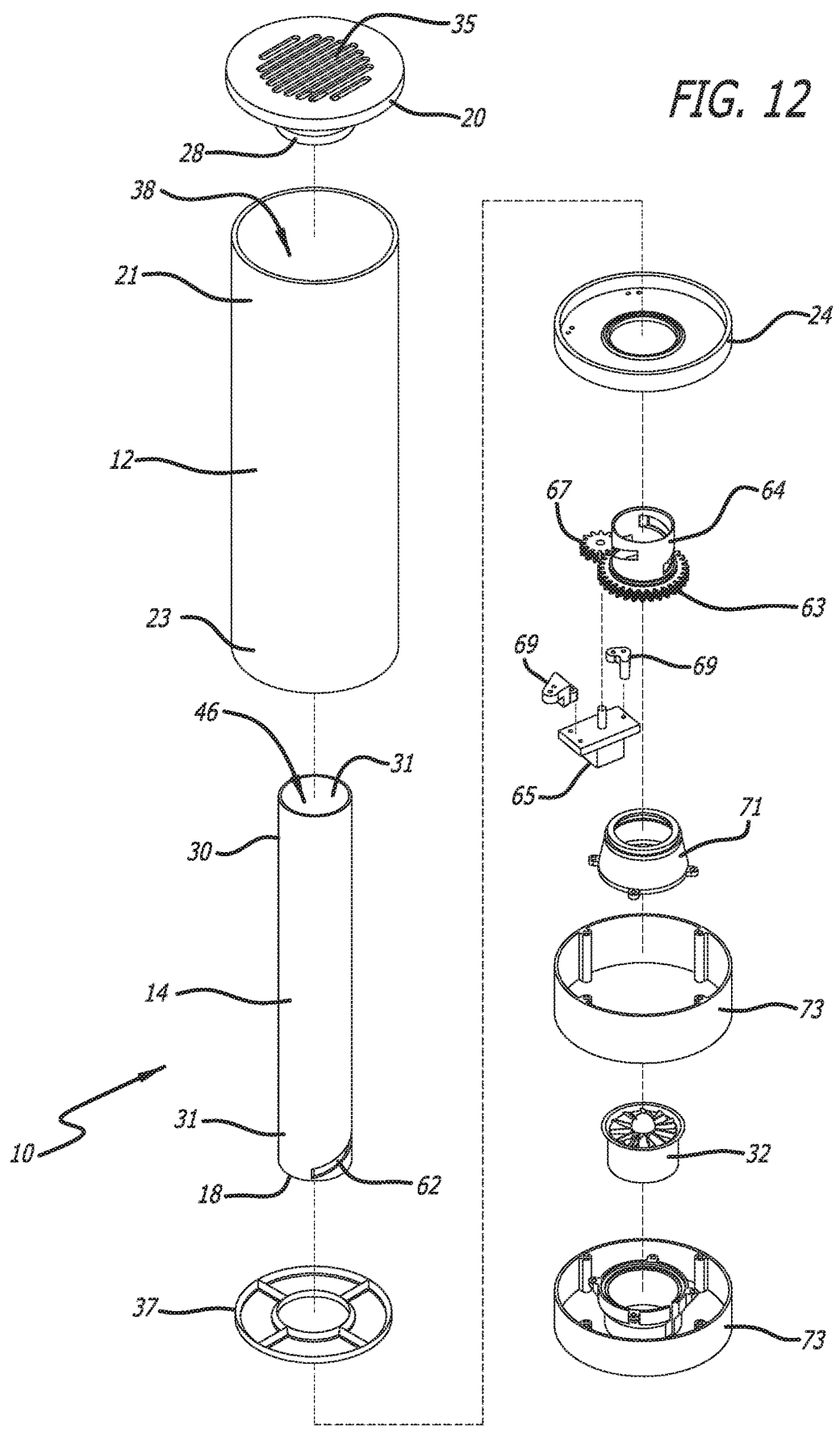
FIG. 12 is an exploded perspective view of the drone dispensing device of FIG. 10.
Figure 13:
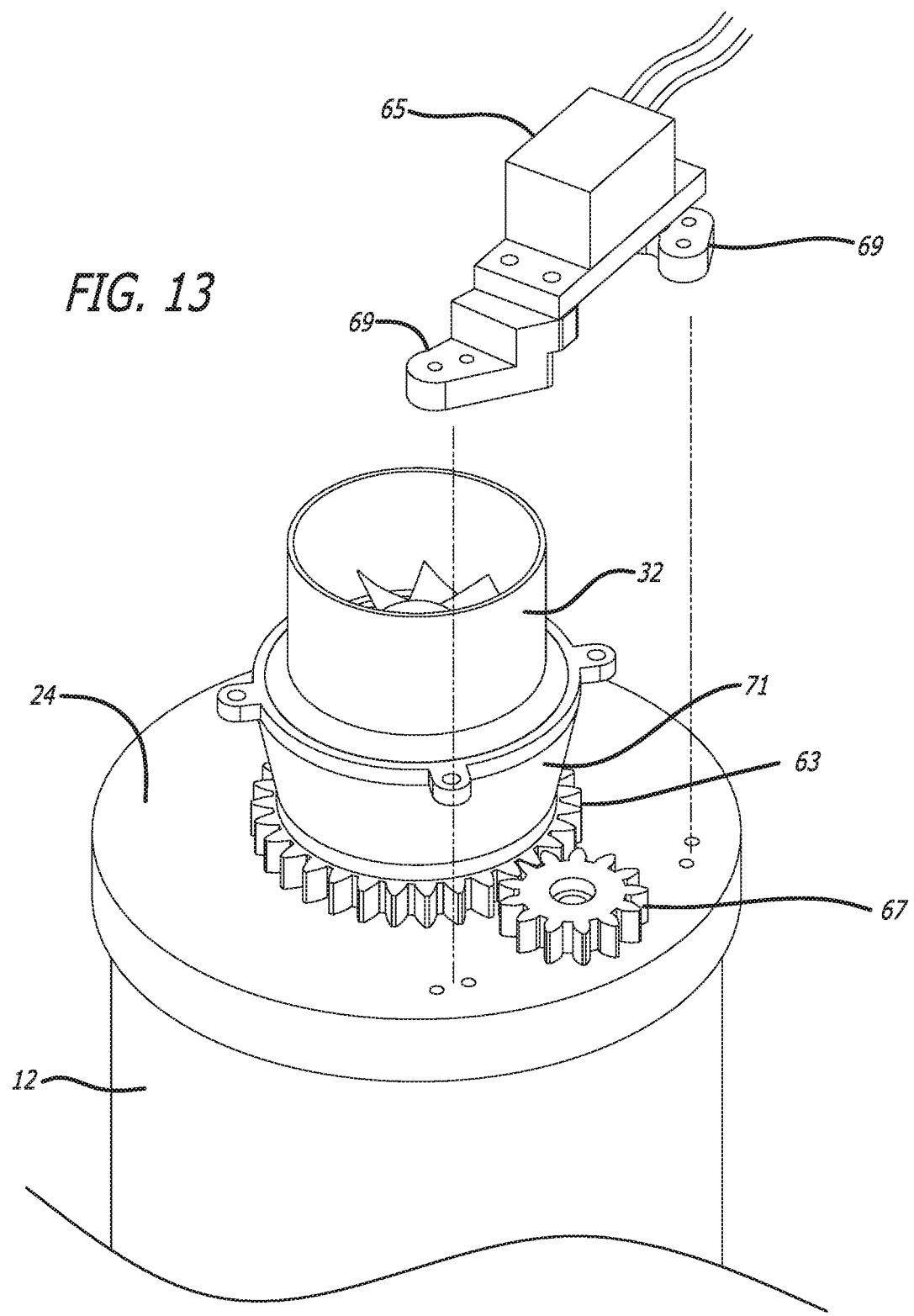
FIG. 13 is a partial bottom perspective view of the drive mechanism for the drone dispensing device of FIG. 10.
Figure 14:
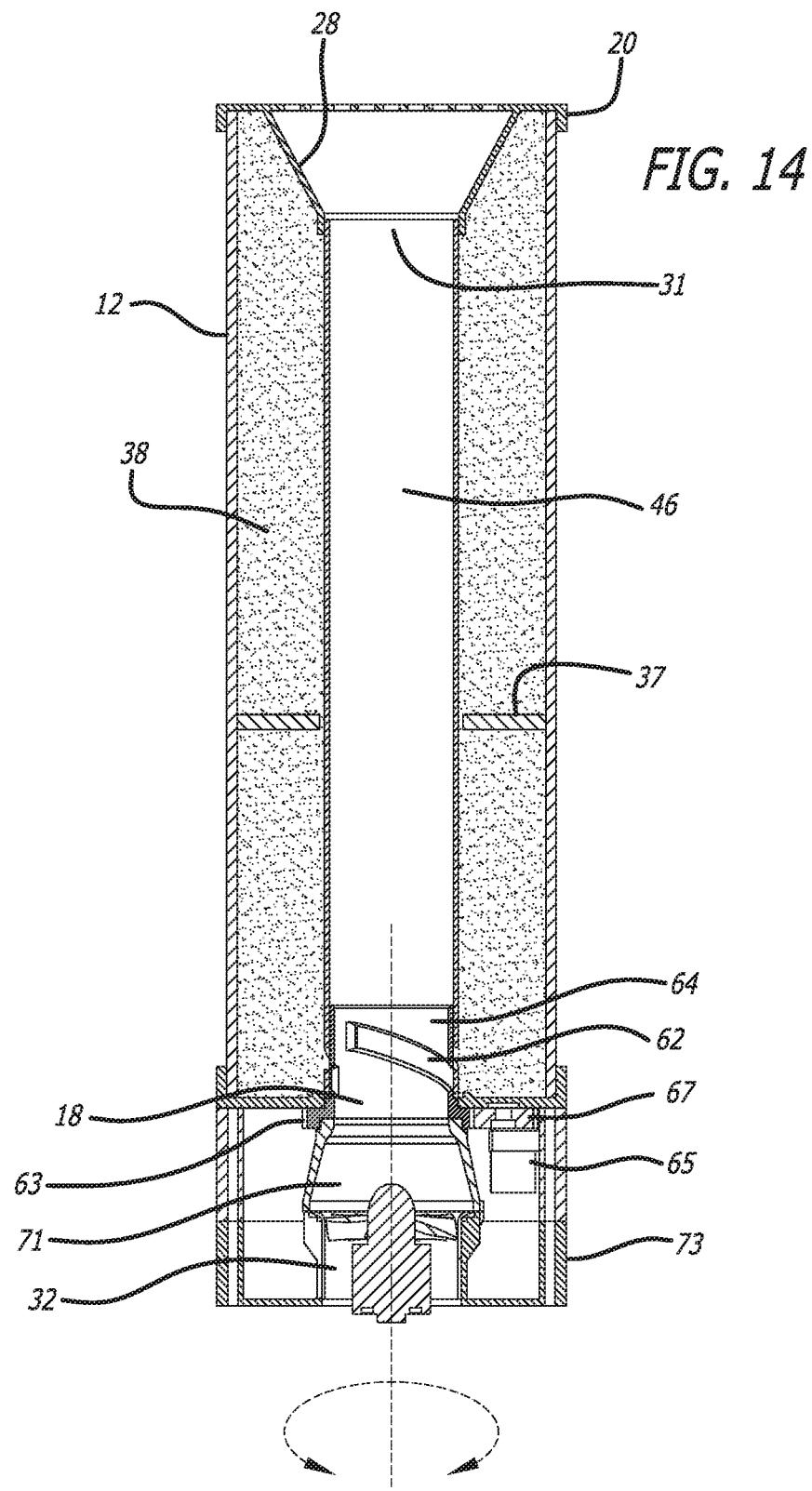
FIG. 14 is a cross-sectional view of the drone dispensing device of FIG. 10 with the dispensing window closed.
Figure 15:
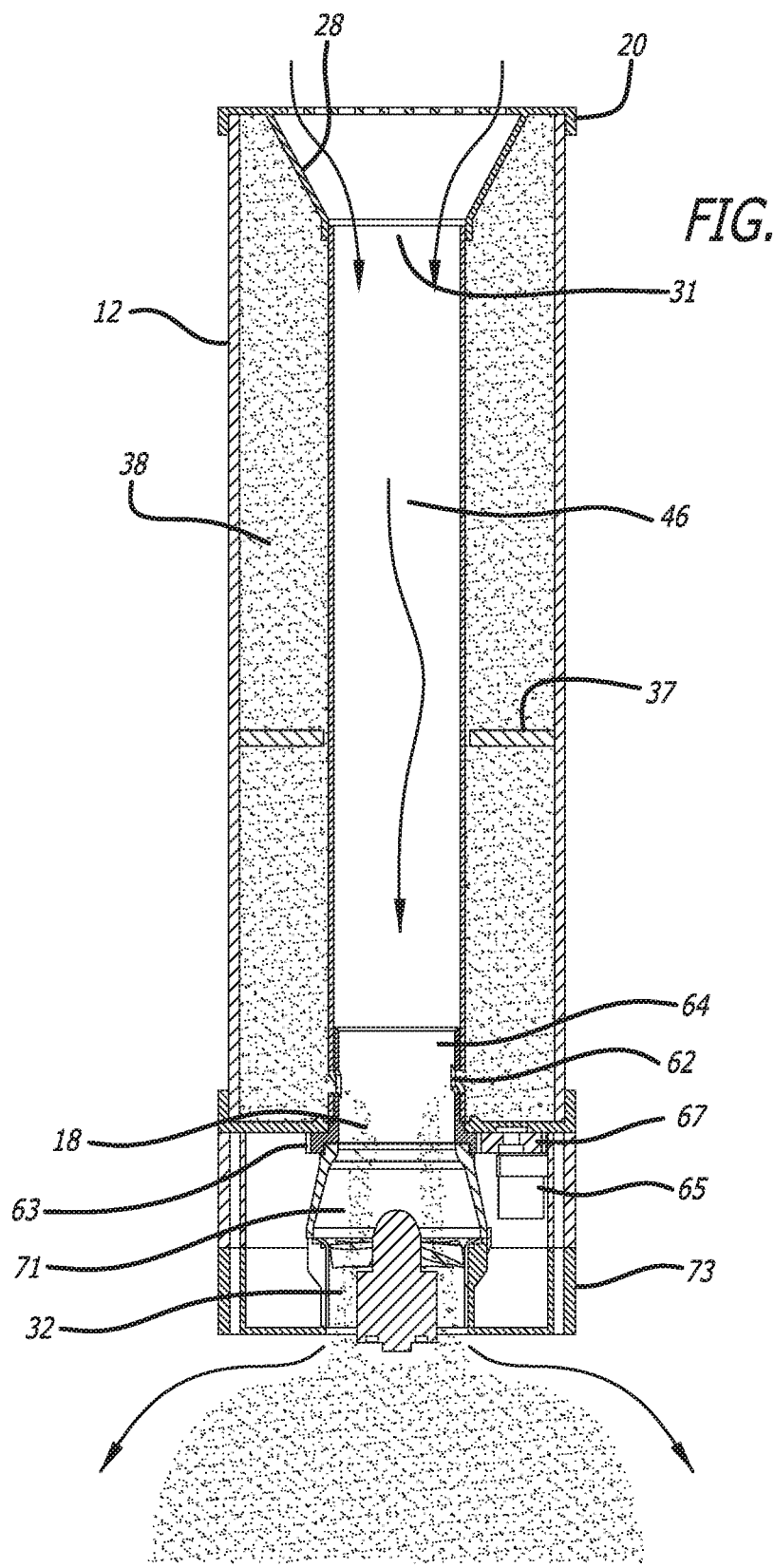
FIG. 15 is a cross-sectional view of the drone dispensing device of FIG. 10 with the dispensing window open.

As best shown in FIGS. 12 and 13, the closure member 64 may have a mating member 63 to mate with a driver 65 for the closure member 64. In one embodiment, the mating member 63 is a gear 63 that is provided at the circumference of the closure member 64, and that mates with a motor gear 67 of the driver 65. In one embodiment the driver 65 is a servo motor 65. The servo motor 65 receives a signal from a controller (not shown) to cause the servo motor 65 to operate. The controller may be integral to the driver 65 or it may be a separate component electrically connected to the driver 65. Typically, the signal provided to the controller will be a radio frequency signal from a remote control device. By controlling movement of the driver 65, the controller controls movement of the closure member 64 between a first position where the apertures 62 are closed (see FIG. 14), and a second position where the apertures 62 are open (see FIG. 15). The closure member 64 preferably rotates between the first position and the second position as rotated by the driver 65. Supports 69 may be provided and, in one embodiment may be connected to the lower cap 24, for supporting the driver 65. The amount of material dispensed from the dispensing device 10 can be controlled by the amount each aperture 62 is opened, as well as the speed of the air acceleration device 32. Specifically, by increasing the speed of the air acceleration device 32, which can be controlled from the remote controller, the volume of air that is pulled through the inner cavity 46 can be drastically increased in volume and velocity, and therefore the amount of material dispensed can be drastically increased as well. The air/material mixture is projected a distance from the dispensing device 10, and the drone 11, by the air acceleration device 32. It is preferred to propel the air/material mixture a distance from the drone 11 to minimize the air/material mixture from being in the turbulent air of the drone's propellers, but to maximize the use of the subsequent downward air flow from the drone's propellers that exists a distance from the drone 11. While not shown, a power source, such as a battery, will also be provided in the dispensing device 10 to provide power to the air acceleration device 32, the driver 65 and the controller, if necessary.

In one embodiment a spacer 71 is provide between the exhaust opening 18 to the inner cavity 46 and the air acceleration device 32. Further, an enclosure 73 may be provided around the air acceleration device 32 and the driver 65, as shown in FIG. 12, to protect those components.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

What is claimed is:

1. A dispensing device for connection to a drone, comprising:
- an outer housing;
- an inner housing interior of the outer housing, the inner housing having an inner cavity, the inner cavity having an entrance opening at a first end of the inner cavity and an exhaust opening at a second end of the inner cavity;
- an outer cavity between the outer housing and the inner housing, the outer cavity adapted to hold a material;
- an upper cap closing a first end of the outer cavity;
- a lower cap closing a second end of the outer cavity;
- an aperture in the inner housing proximal a bottom of the outer housing to provide fluid access between the outer cavity and the inner cavity to allow material in the outer cavity to be transferred to the inner cavity and mixed with air to create an air and material mixture;
- a closure member adjacent the aperture to open and close the aperture as desired to dispense material from the outer cavity into the inner cavity for mixing with air in the inner cavity;
- a controller for controlling movement of the closure member between a first position where the aperture is closed, and a second position where the aperture is open; and,
- a fan adjacent the exhaust opening to the inner cavity to accelerate the air and material mixture out of the dispensing device.

2. The dispensing device of claim 1, wherein the closure member comprises a seal inside the inner cavity, the seal rotating between the first position and the second position.

3. The dispensing device of claim 1, further comprising a driver electrically connected to the controller, the driver moving the closure member between the first position and the second position.

4. The dispensing device of claim 3, wherein the driver comprises a gear connected to the closure member to rotate the closure member between the first position and the second position.

5. The dispensing device of claim 1, wherein the controller comprises a receiver for receiving a radio frequency signal from a remote device.

6. The dispensing device of claim 1, further comprising a cover over the entrance opening of the inner housing, the cover having a plurality of apertures there through.

7. The dispensing device of claim 6, further comprising a funnel below a surface of the cover to direct air into the entrance opening of the inner housing.

8. The dispensing device of claim 1, further comprising a connector to secure the dispensing device to the drone.

9. A dispensing device for connection to a drone, comprising:
- an outer housing;
- an inner housing interior of the outer housing, the inner housing having an inner cavity having an entrance opening at a first end of the inner cavity and an exhaust opening at a second end of the inner cavity;
- an outer cavity between the outer housing and the inner housing, the outer cavity adapted to hold a material;
- an upper cap closing a first end of the outer cavity;
- a lower cap closing a second end of the outer cavity;
- a fluid access opening to provide fluid access between the outer cavity and the inner cavity to allow material in the outer cavity to be transferred to the inner cavity and mixed with air to create an air and material mixture; and,
- an air accelerator adjacent the inner cavity to accelerate the air and material mixture out of the dispensing device.

10. The dispensing device of claim 9, wherein the air accelerator is a fan adjacent the exhaust opening to the inner cavity.

11. The dispensing device of claim 9, wherein the air accelerator is a fan adjacent the entrance opening to the inner cavity.

12. The dispensing device of claim 9, further comprising a closure member adjacent the fluid access opening to open and close the fluid access opening as desired to dispense material from the outer cavity into the inner cavity for mixing with air in the inner cavity.

13. The dispensing device of claim 12, wherein the closure member rotates between a closed position and an open position.

14. The dispensing device of claim 13, further comprising a motor having a gear to drive rotation of the closure member.

15. The dispensing device of claim 12, further comprising a controller for controlling movement of the closure member to selectively open and close the fluid access opening.

16. The dispensing device of claim 13, wherein the controller comprises a receiver for receiving a radio frequency signal from a remote device.

17. A dispensing device for connection to a drone, comprising:
- an outer housing connected to a drone;
- an inner housing interior of the outer housing, the inner housing having an inner cavity having an entrance opening at a first end of the inner cavity and an exhaust opening at a second end of the inner cavity;
- an outer cavity between the outer housing and the inner housing, the outer cavity adapted to hold a material;
- an upper cap closing a first end of the outer cavity;
- a lower cap closing a second end of the outer cavity;
- a fluid access opening to provide fluid access between the outer cavity and the inner cavity to allow material in the outer cavity to be transferred to the inner cavity; and,
- an air accelerator adjacent the inner cavity to accelerate an air and material mixture out of the dispensing device.

18. The dispensing device of claim 17, wherein the outer housing is connected to the drone adjacent a side of the drone.

19. The dispensing device of claim 17, wherein the outer housing is connected to the drone adjacent a bottom of the drone.

20. The dispensing device of claim 17, wherein the air accelerator accelerates the air and material mixture a distance beyond a turbulence area of the drone.

* * * * *